US006898859B2

(12) United States Patent
Taniguchi et al.

(10) Patent No.: US 6,898,859 B2
(45) Date of Patent: May 31, 2005

(54) ROTARY DISC FOR ENCODER

(75) Inventors: Mitsuyuki Taniguchi, Gotenba (JP); Keisuke Imai, Yamanashi (JP)

(73) Assignee: FANUC LTD, Yamanashi (JP)

( * ) Notice: Subject to any disclaimer, the term of this patent is extended or adjusted under 35 U.S.C. 154(b) by 0 days.

(21) Appl. No.: 10/683,436

(22) Filed: Oct. 14, 2003

(65) Prior Publication Data

US 2004/0078987 A1 Apr. 29, 2004

(30) Foreign Application Priority Data

Oct. 23, 2002 (JP) ....................................... 2002-308122

(51) Int. Cl.[7] .................................................. G01B 5/24
(52) U.S. Cl. ....................................................... 33/1 PT
(58) Field of Search ................................. 33/1 PT, 1 N, 33/534, 613, 645, 520, 644; 414/935, 936, 941

(56) References Cited

U.S. PATENT DOCUMENTS 3,628,038 A 12/1971 Culver et al.
3,744,138 A * 7/1973 Schuler ........................ 33/534
4,944,650 A * 7/1990 Matsumoto ................. 414/936
5,938,902 A * 8/1999 Nguyen et al. ............. 414/729
6,255,644 B1 7/2001 Taniguchi et al.
6,530,157 B1 * 3/2003 Henderson et al. ........... 33/644
6,682,295 B2 * 1/2004 Blank et al. ................ 414/936

FOREIGN PATENT DOCUMENTS

JP 63-240358 10/1988
JP 11-14404 1/1999
JP 11-014404 1/1999

OTHER PUBLICATIONS

European Search Report dated Feb. 2, 2004 for corresponding EP Application No. 03256618.
Notice of Reasons for Rejection for Corresponding Japanese Application 2002–308122 mailed Dec. 7, 2004.

* cited by examiner

*Primary Examiner*—Christopher W. Fulton
(74) *Attorney, Agent, or Firm*—Staas & Halsey LLP

(57) ABSTRACT

A rotary disc for use in a rotary encoder includes a signal generation section having a pattern formed thereon to generate a signal indicative of a rotational angle/phase. The signal generation section has a peripheral surface, which is provided with a linear portion usable as an indicator indicative of the rotational angle/phase represented by the signal generation pattern on the signal generation section. A robot hand is employed to hold the linear portion and attach it through an attachment portion of the rotary disc to a rotor shaft of a motor.

12 Claims, 4 Drawing Sheets

1
4
4
6
6

ROTARY DISC FOR ENCODER

BACKGROUND OF THE INVENTION

1. Field of the Invention

The present invention relates to a rotary disc for a rotary encoder operative to detect a rotational angle of a rotary shaft, for example.

2. Description of the Related Art

For control of exciting currents in respective phases of a motor, an encoder is attached to a rotor shaft of the motor and employed as a means to detect a rotational angle or phase of a rotor. A rotary disc 15 for use in the encoder comprises, as shown in FIG. 7, a signal generation section 16 configured to generate a signal indicative of angular position, an angle of rotation or phase, and an attachment portion 17 adapted to be attached to the rotor shaft.

The signal generation section 16 has a pattern formed on a disc surface to generate a signal indicative of angular position, an angle of rotation or phase. An optical encoder has a certain slit pattern formed on the disc surface to generate a signal usable to detect a rotational angle/phase.

On detection of an angular position, an angle of rotation or phase of the rotor by way of the rotary disc 15 attached to the rotor shaft of the motor, an angular position, an angle of rotation or phase of the rotor is required to correspond to the position or phase of the signal generated from the signal generation section 16 in the rotary disc 15. For that purpose, parts of the attachment portion 17 are flattened to form non-rotational symmetric sections 18. These non-rotational symmetric sections 18 are configured to have a known positional relation to the positional signal generation pattern on the signal generation section 16. When attaching the rotary disc 15 to the rotor shaft, attention is paid so that the signal generated from the signal generation section 16 in the rotary disc corresponds to the angular position, angle of rotation or phase of the rotor, using the non-rotational symmetric sections 18.

FIG. 8 illustrates attachment of the rotary disc 15 to a rotor shaft 12 of a motor.

First, a DC current is supplied to a stator 10 to generate an electromagnetic attractive force to fix an angular position, angle of rotation or phase of a rotor 11. A jig 19 is employed to hold the non-rotational symmetric sections 18 of the attachment portion 17 to fit and attach the attachment portion 17 to the rotor shaft 12. In this case, a signal indicative of an angular position, angle of rotation or phase outputted from the signal generation section 16 of the rotary disc 15 can represent the angular position, angle of rotation or phase of the rotor 11 if the rotary disc is attached in a manner such that the phase of the rotary disc corresponds to that of the rotor.

The rotary disc 15 may be configured to include the signal generation section 16 and the attachment portion 17 formed integrally or separately as disclosed in Japanese Patent Application Laid-open No. H11-14404, for example.

The above-described conventional rotary disc requires a member for adjustment of angular position, angle of rotation or phase. As shown in FIGS. 7 and 8, the member for adjusting an angular position, angle of rotation or phase (which is configured by an attachment member) requires a length to some extent to accurately represent its angular position, angle of rotation or phase. Therefore, a total height of the rotary disc is increased by that extent, and the axial length of the encoder is increased accordingly. This is a problem.

If a rotary disc consists of two members, the cost is elevated consequently. Further, an error associated with assembling of the two members lowers the phase adjusting accuracy. Therefore, it is envisioned that the disc forming a signal generation section and the attachment member having a phase-adjustment portion for use in attachment to the rotary shaft are integrated and resin-molded to solve such the problem. As the two members have quite different shapes, however, it is difficult to find a molding condition to mold them integrally.

If the rotary disc is automatically assembled to the rotor shaft of the motor, a robot is employed to handle the rotary disc. As shown in FIG. 7, a grip like the non-rotational symmetric section 18 is required.

SUMMARY OF THE INVENTION

The present invention relates to a rotary disc for an encoder attached to a rotary shaft to detect a rotational angle of the rotary shaft. The rotary disc comprises a disc-shaped signal generation section, and an indicator arranged on the signal generation section at a peripheral portion thereof and usable to position the rotary disc on the rotary shaft at a certain position.

The indicator may be arranged on the signal generation section of the rotary disc at a peripheral surface thereof. Alternatively, the signal generation section may be formed in a non-circular shape, which serves as an indicator.

The rotary disc further may comprise a grip provided on the peripheral surface of the signal generation section to facilitate a robot hand to hold the rotary disc. The indicator may be formed by processing the peripheral surface of the rotary disc or formed of a specified shape provided in the peripheral surface of the rotary disc. The shape of the indicator may comprise a straight line, a circular arc or a combination thereof so that the indicator serves also as the grip. The rotary disc is composed of a plastic to be molded integrally.

With the present invention, obtained is a rotary disc which can be easily manufactured and which is inexpensive, not required to have an increased length along the axis of the rotary disc, and suitable for robot handling.

DESCRIPTION OF THE EMBODIMENTS

Figure 1:
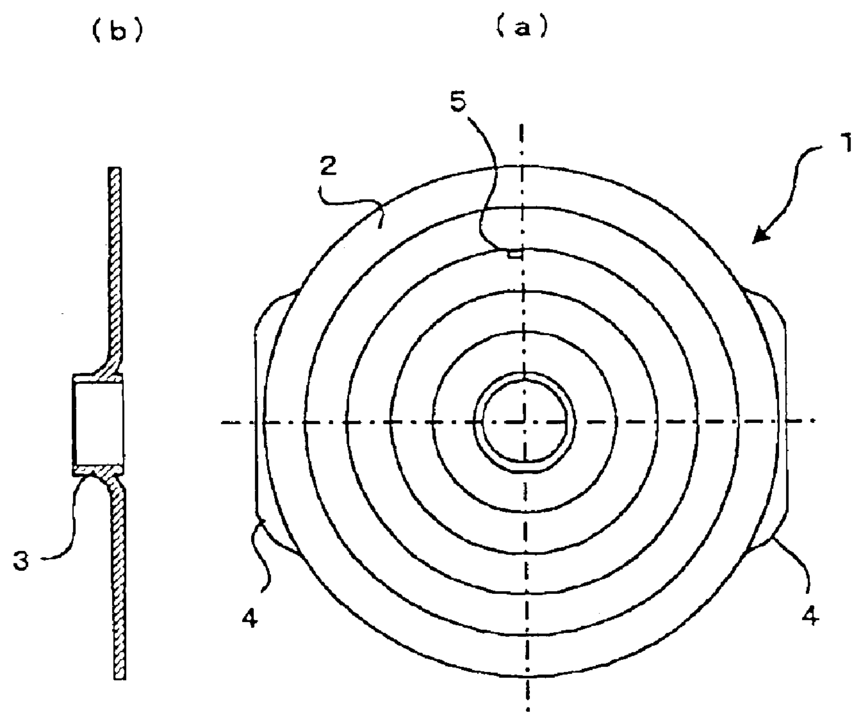
FIG. 1 illustrates a rotary disc for an encoder according to a first embodiment of the present invention.

FIG. 1 illustrates a first embodiment of the present invention. FIG. 1(*a*) is a front view of a rotary disc 1 of the embodiment; and FIG. 1(*b*) is a central cross-sectional view thereof. The rotary disc 1 comprises a signal generation section 2 formed in an almost disc shape; an attachment portion 3; and a linear portion 4 having an indicator and grip for adjusting an angular position, angle of rotation or phase.

The signal generation section 2 is configured to have a certain pattern code formed on a disc surface of the rotary disc to generate a rotational angle detection signal (rotational position detection signal). In an optical encoder, the signal generation section 2 is provided with a certain code pattern consisting of slits as in the case of prior art. The attachment portion 3 is employed to attach the rotary disc 1 to a rotor shaft of a motor and, in this embodiment, it is formed integrally with a disc forming the signal generation section 2.

The disc forming the signal generation section 2 is provided with linear portions 4 formed on parts of a peripheral surface thereof. In this embodiment, two linear portions 4 are formed around the peripheral surface of the disc symmetrical with respect to a straight line passing through a reference signal generator 5 in the signal generation section 2 and the center of the disc forming the signal generation section 2, and also in parallel with that straight line. The linear portion 4 for forming the indicator has a fixed relation to the pattern for signal generation (which generates a signal indicative of an angular position, angle of rotation or phase) provided in the signal generation section 2. Therefore, it serves as an indicator in attaching the rotary disc 1 to a rotor shaft of a motor (not shown).

Figure 2:
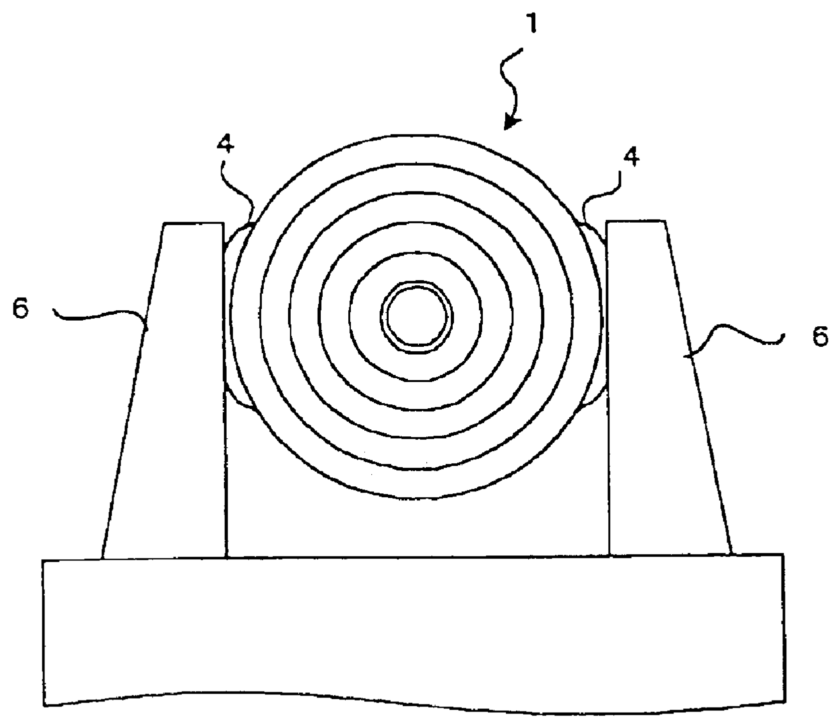
FIG. 2 shows the rotary disc of FIG. 1 held in a robot hand.
Figure 8:
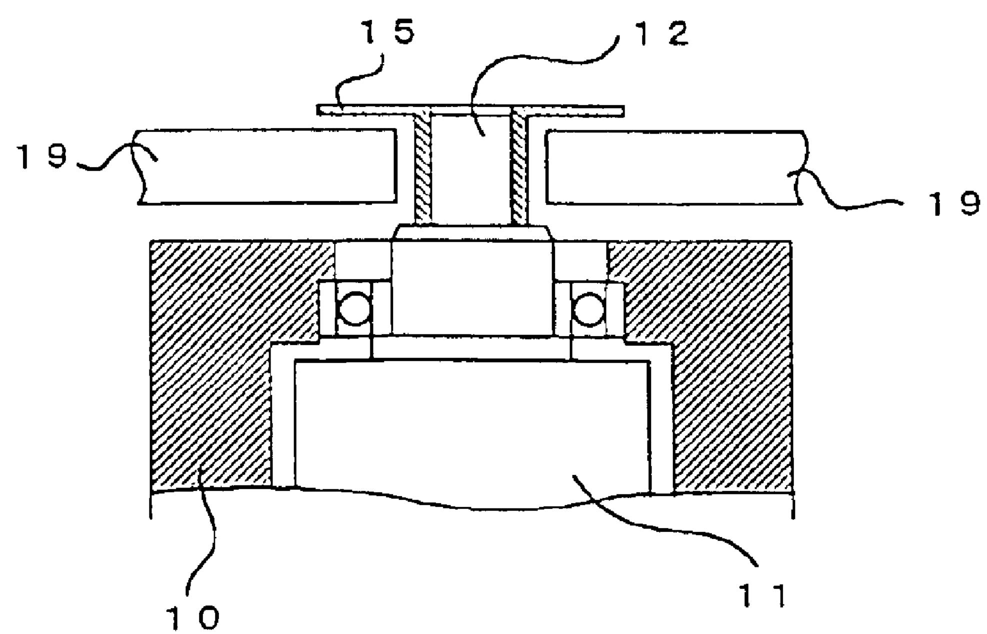
FIG. 8 illustrates attachment of the rotary disc of FIG. 7 to a rotor shaft of a motor.

In this embodiment, the indicator of the linear portion 4 is formed on the peripheral surface of the signal generation section 2 in the rotary disc 1 to allow the robot hand 6 to hold the rotary disc 1 using the linear portion 4 as a grip as shown in FIG. 2. As a result, while the conventional rotary disc as shown in FIG. 8 requires a longer axial length of the attachment portion of the rotary disc for use in attachment to the rotor shaft to allow the robot hand to handle it, the attachment portion 3 can be formed shorter, as shown in FIG. 1(*b*), to reduce the thickness (axial length) of the rotary disc 1. The attachment portion 3 formed shorter allows the rotary disc 1 to be configured integrally in a single member and made of a plastic easily.

Figure 3:
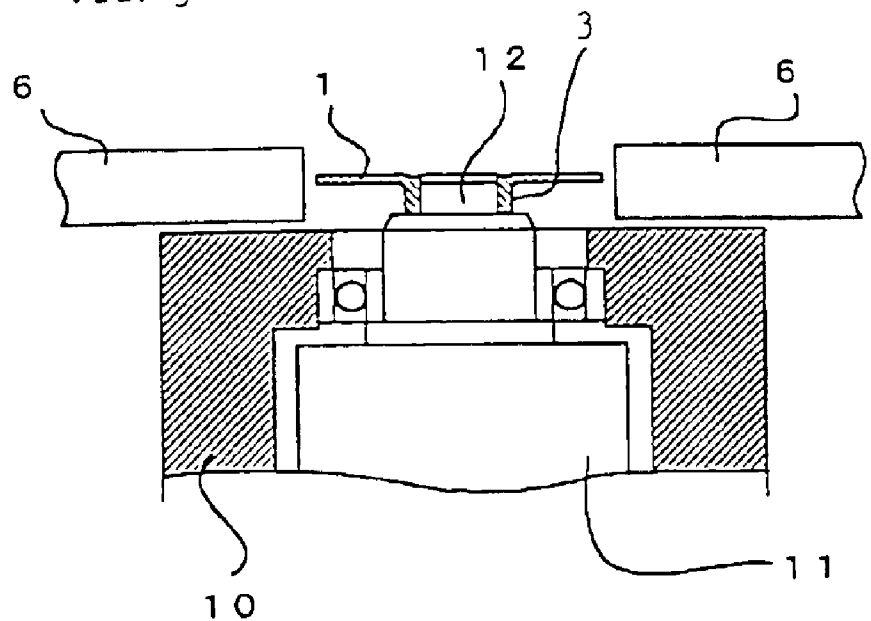
FIG. 3 illustrates attachment of the rotary disc to a rotor shaft of a motor.

FIG. 3 illustrates attachment of the rotary disc 1 to a rotor shaft of a motor. Similar to a conventional motor, a DC current is supplied to the stator 10 in the motor to generate an electromagnetic attractive force to fix angular position, angle of rotation or phase of the rotor 11. In addition, as shown in FIG. 2, the robot hand 6 is employed to hold the rotary disc 1 using the linear portion 4 of the rotary disc. The linear portion 4 has a certain known relation to the position (phase) of the pattern for signal generation on the signal generation section 2 in the rotary disc 1. Accordingly, the robot can grasp the position (phase) of the pattern on the signal generation section 2 in the rotary disc 1, which the robot holds.

Thus, the angular position, angle of rotation or phase of the rotor 11 is fixed and, the rotary disc 1 is attached to the rotor shaft 12 as shown in FIG. 3., making angular position, angle of rotation or phase generated from the signal generation section 2 of the rotary disc 1 correspond to the definitely determined angular position, angle of rotation or phase of the rotor. Even when the rotary disc 1 is manually attached to the rotor shaft 12, the position (phase) of the pattern in the signal generation section 2 can be grasped from the position of the linear portion 4. Accordingly, the rotary disc 1 can be easily attached to the rotor shaft 12 with the angular position, angle of rotation or phase of the rotor adjusted.

As obvious from the comparison of FIG. 3 with FIG. 8 in the prior art, the rotary disc 1 of the present embodiment has a shorter axial length of the attachment portion 3. Therefore, the axial length of the motor that includes the rotary disc 1 attached thereto can be shortened advantageously to form a compact motor.

Figure 4:
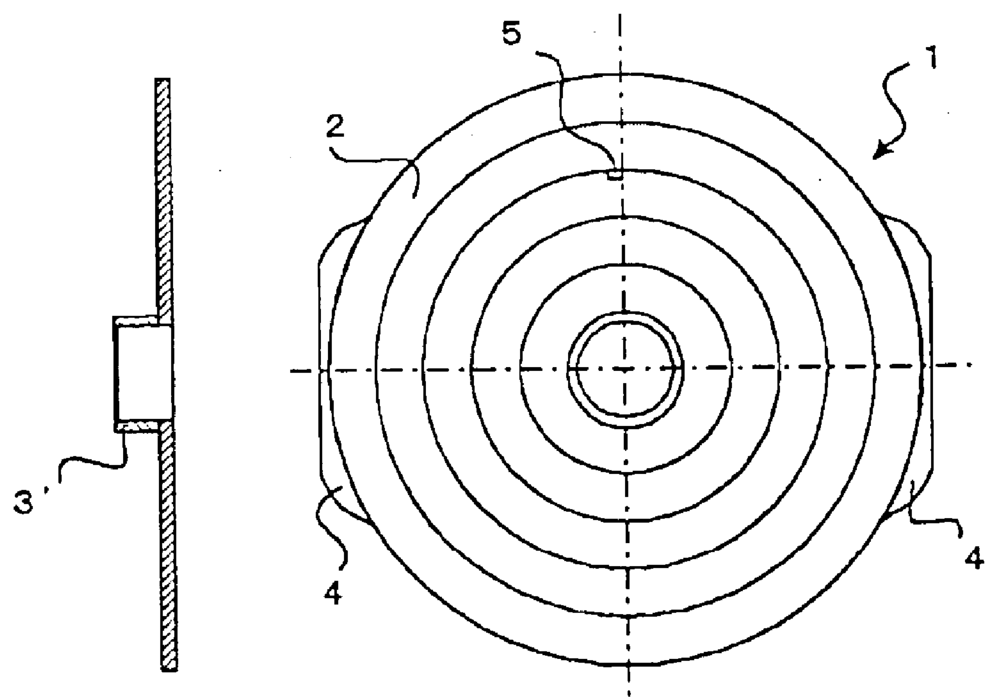
FIG. 4 illustrates a modification of the rotary disc for an encoder according to the first embodiment of the present invention.

In the first embodiment described above, the signal generation section 2 and the attachment portion 3 are integrally made of a resin. Alternatively, the signal generation section 2 and the attachment portion 3 may be formed individually. FIG. 4 shows a rotary disc 1 configured in such a way, and FIG. 4(*a*) is a front view and FIG. 4(*b*) is a central cross-sectional view. In this embodiment, the disc forming the signal generation section 2 and an attachment portion 3' are formed of individual members, which are bonded together to form the rotary disc 1.

Alternatively, an attachment portion may not be provided specially and a central bore portion in a disc forming a signal generation section 2 may be used as an attachment portion. In this case, a portion serving as an indicator for adjusting an angular position, angle of rotation or phase is provided on the disc peripheral portion of the signal generation section 2 so that a robot hand can hold the position. This structure is not required to include an attachment portion having an indicator for adjusting angular position, angle of rotation or phase. Thus, the disc forming the signal generation section 2 may be directly attached to the rotor shaft of the motor with easy works.

Figure 5:
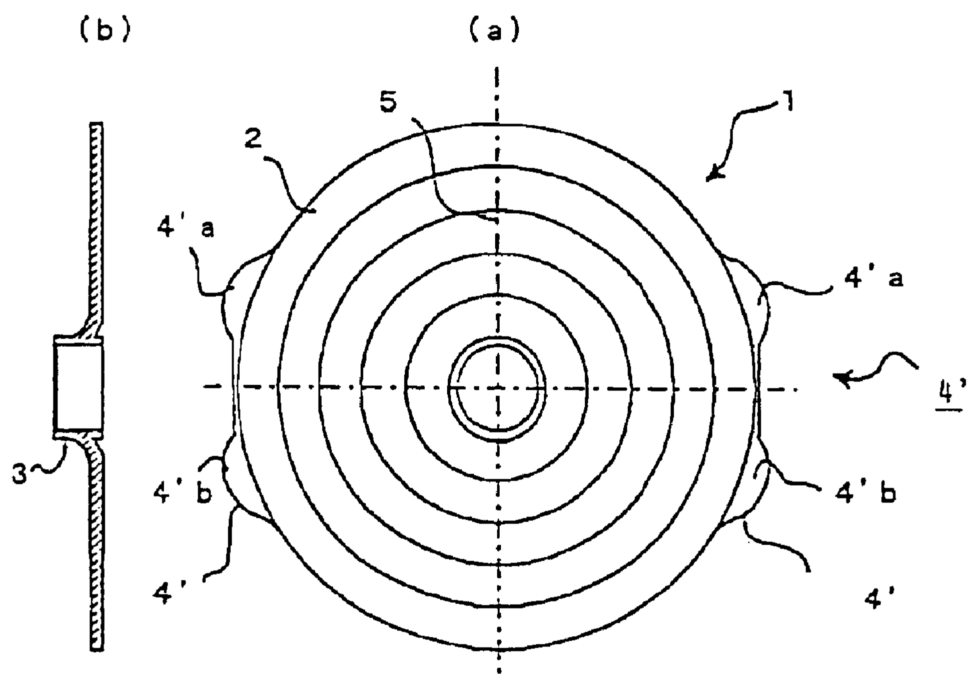
FIG. 5 illustrates a rotary disc for an encoder according to a second embodiment of the present invention.

FIG. 5 illustrates a second embodiment of the present invention. It differs from the above-described first embodiment in that an indicator for adjustment of an angular position, angle of rotation or phase is not a linear portion formed on the disc peripheral portion of the signal generation section but a rugged portions 4' composed of curves. The same elements as those in the first embodiment shown in FIG. 1 are denoted with the same reference numerals.

Figure 6:
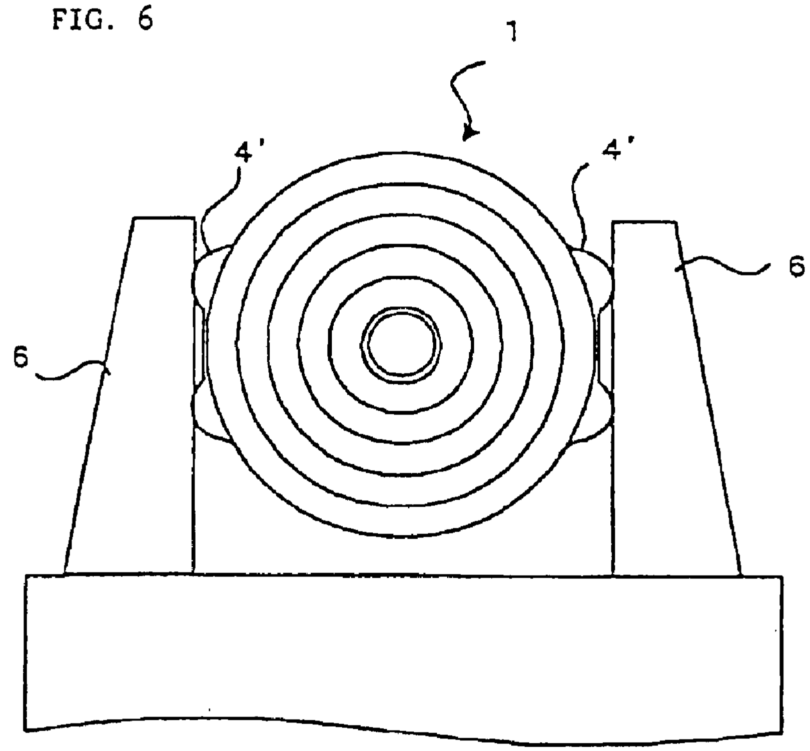
FIG. 6 shows the rotary disc of FIG. 5 held in a robot hand.
Figure 7:
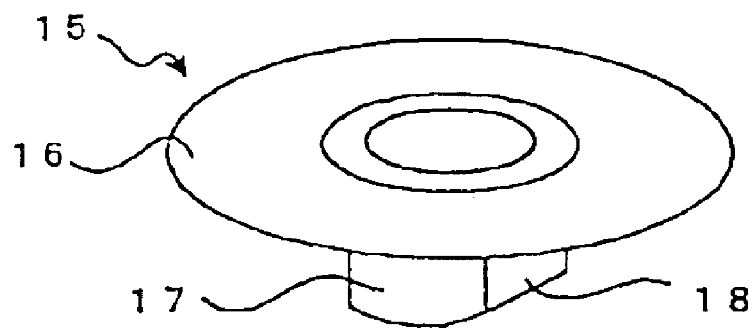
FIG. 7 illustrates a conventional rotary disc for an encoder.

In the second embodiment, the rugged portion 4' composed of curves serving as an indicator for adjustment of angular position, angle of rotation or phase is provided on the peripheral portion of the disc forming the signal generation section 2. Also in this embodiment, as shown in FIG. 6, a robot hand is employed to hold the rugged portion 4', allowing the rotary disc to be held securely.

In the example shown in FIG. 5, the rugged portions 4' are formed on the disc peripheral portion at symmetric locations with respect to a straight line passing through the reference signal generator 5 in the signal generation section 2 and the center of the disc forming the signal generation section 2. In addition, when the robot hand holds the two rugged portions 4', it can hold the disc steadily as shown in FIG. 6. This is effective to definitely grasp the position or phase of the signal pattern on signal generation section 2 in the rotary disc 1. In the example of the rugged portion 4' shown in FIG. 5, it has protruded circular arc portions 4'*a* and 4'*b* provided at both sides. A straight line, which contacts the two protruded circular arc portions 4'*a* and 4'*b*, is formed in parallel with the above-described straight line passing through the reference signal generator 5 and the center of the disc forming the signal generation section 2.

In the above embodiments, the peripheral surface of the disc forming the signal generation section 2 is not shaped in a circular arc but in a rugged portion consisting of straight lines or a combination of curves and straight lines to form the indicator. Alternatively, instead of providing such shape, a particular process may be applied to the peripheral surface or the peripheral portion of the disc to form an indicator. In this case, the position of the indicator is determined to have a known relation of position or phase to the signal generation pattern in the signal generation portion 2.

In the above embodiments, the linear portion 4 or the rugged portion 4' are configured to serve as an indicator for adjustment of angular position, angle of rotation or phase as well as a grip for holding the rotary disc. Alternatively, an indicator may be located at a different position from the grip. For example, in FIG. 1, a process which gives a certain mark may be applied or certain shape may be formed as an indicator in the peripheral surface or the peripheral portion of the disc, on the line passing through the reference signal generator 5 and the disc center.

In the present invention, an indicator for adjustment of angular position, angle of rotation or phase is provided at a disc peripheral portion of the signal generation section. Therefore, the attachment portion for use in attachment of a rotary disc to the rotor shaft of a motor can be formed to have a shorter axial length. Accordingly, the rotary disc itself can be formed in a compact shape with a shorter axial dimension. Consequently, the axial length of the motor, to which an encoder using a rotary disc is attached, can be formed shorter.

As the attachment portion has a shorter axial length, the whole rotary disc can be formed integrally without any errors. Further, a grip provided on the disc is formed in a shape to allow a robot hand to hold it. This is effective to automate the work for attachment of the disc to the rotor shaft of a motor while the robot hand holds the grip.

What is claimed is:

1. A rotary disc for an encoder, adapted to be attached to a rotary shaft to detect a rotational angle of said rotary shaft, wherein an indicator to position said rotary disc on said rotary shaft at a certain position with a rotational direction, is arranged on a signal generation section of said rotary disc, and wherein said indicator extends from a peripheral portion of said rotary disc.

2. The rotary disc for an encoder according to claim 1, wherein said indicator is arranged on said signal generation section at a peripheral surface thereof.

3. The rotary disc for an encoder according to claim 1, wherein said signal generation section is formed in a non-circular shape, said non-circular shape serving as said indicator for positioning said rotary disc on said rotary shaft at a predetermined position.

4. The rotary disc for an encoder according to claim 1, further comprising a grip provided on said peripheral surface of said signal generation section and usable to hold said rotary disc.

5. The rotary disc for an encoder according to claim 1, wherein said indicator is formed by a processing applied to, or by a shape provided in, said peripheral surface of said signal generation section.

6. The rotary disc for an encoder according to claim 5, wherein said processing applied to, or said special shape provide in, said peripheral surface of said signal generation section to form said indicator is configured to have a straight line, a circular arc or a combination thereof and serve as a grip adapted to hold said rotary disc.

7. The rotary disc for an encoder according to claim 1, wherein said rotary disc is made of a plastic.

8. A rotary disc for an encoder, adapted to be attached to a rotary shaft to detect a rotational angle of said rotary shaft, said rotary disc comprising:

a signal generation section; and a shaft attachment portion; wherein a plurality of grips is formed on said signal generation section at a peripheral surface thereof so as to protrude outwardly and arranged symmetrically with respect to a straight line passing through the center of said signal generation section, and each of said grips has an outer end with a flat plane or a recessed center, and said outer end of said grip has a fixed positional relation to said signal generation section.

9. The rotary disc for an encoder according to claim 8, wherein said straight line also passes through a reference signal generator formed in said signal generation section.

10. A rotary disc for an encoder adapted to be coupled to a rotary shaft to detect a rotation angle of the rotary shaft, comprising an indicator extending from a peripheral portion of the rotary disc, said indicator to position the rotary disc on the rotary shaft at a predetermined position in a rotational direction.

11. The rotary disc according to claim 10 wherein said indicator includes a grip by which said rotary disc may be held.

12. An apparatus comprising:

a rotary disc adapted to be attached to a rotary shaft for use in detecting a rotational angle of the rotary shaft; and an indicator extending from a peripheral portion of said rotary disc, to position the rotary disc on the rotary shaft at a predetermined position in a rotational direction.

* * * * *

UNITED STATES PATENT AND TRADEMARK OFFICE

CERTIFICATE OF CORRECTION

PATENT NO. : 6,898,859 B2
DATED : May 31, 2005
INVENTOR(S) : Mitsuyuki Taniguchi et al.

It is certified that error appears in the above-identified patent and that said Letters Patent is hereby corrected as shown below:

Column 5,
Line 26, after "any" insert -- assembly --.

Signed and Sealed this

Twenty-first Day of March, 2006

JON W. DUDAS
*Director of the United States Patent and Trademark Office*